Patented May 5, 1936

2,040,061

UNITED STATES PATENT OFFICE 2,040,061

QUATERNARY AMMONIUM COMPOUNDS

Ferdinand Münz, Frankfort-on-the-Main, and Karl Keller, Frankfort-on-the-Main-Fechenheim, Germany, assignors to General Aniline Works, Inc., New York, N. Y., a corporation of Delaware No Drawing. Application October 5, 1934, Serial No. 747,078. In Germany October 21, 1933

4 Claims. (Cl. 8—5)

Our invention relates to quaternary ammonium compounds.

In U. S. application Serial No. 715,993, filed March 16, 1934, by Otto Bayer, Ferdinand Münz and Karl Keller, there is described the manufacture of valuable quaternary ammonium compounds by further treating with alkylating or aralkylating agents, the nitrogenous condensation products described in U. S. application Serial No. 715,992, filed March 16, 1934, by the same inventors, and characterized by the fact that they contain in the molecule the radicle of at least one aliphatic polyamine, which has substituted for the nitrogen atoms thereof radicles containing at least two acyl groups or one acyl group and one alkyl group. The said quaternary compounds are distinguished by the valuable property, on after treatment therewith of dyeings which have been prepared on cellulose materials by means of substantive dyestuffs, of substantially improving the said dyeings as regards fastness to water, perspiration, boiling acids and in many cases, in a surprising manner, to washing.

Our present invention is based on the discovery that further alkylated or aralkylated products of some polyamines rather surprisingly have an equivalent or even better effect if they do not contain acylamino groups.

Polyethylenepolyamine is technically the most accessible of the polyamines. When prepared by the action of aqueous ammonia on di-halogens, i. e. ethylene chloride and its higher homologues (see Berichte, vol. 23, page 3711) it comprises a mixture of polyethylenepolyamines of the general formula

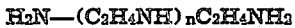

in admixture with compounds of the general formula

i. e. piperazine when $n=2$, triethylenetriamine when $n=3$ and similar products.

Whereas ethylenediamine itself and the next higher polymeric compounds such as for example diethylenetriamine, triethylenetriamine and triethylenetetramine require the introduction of acyl groups for the production of products of technical value, in accordance with the present invention, mixtures of polymeric bases containing substantial proportions of products corresponding to the above formula, in which $n$ is greater than 2, on far reaching alkylation or aralkylation, yield immediately valuable agents for the after treatment of dyeings. Far reaching alkylation is of advantage whereby nitrogen atoms are transformed as far as possible into the pentavalent state.

In order to further illustrate our invention the following example is given, the parts being by weight and all temperatures in centigrade degrees; but it is, however, to be understood that our invention is not limited to the particular products nor reacting conditions mentioned therein:

Example

From a mixture of polyethylenepolyamines, obtained by treating aqueous ammonia with ethylene chloride (Berichte 23, p. 3711), the fractions boiling under 10 mm. pressure up to 220° C. are distilled off. 150 parts of the residue, which is a viscous brown liquor, are dissolved in 2000 parts of water and at 25° to 30° C. 1200 parts of dimethyl sulfate are slowly added, care being taken that the reaction is maintained permanently alkaline by the simultaneous addition of sodium carbonate. When the reaction is complete, the separated inorganic salts are removed by filtration. The brownish solution thus obtained may, after suitable dilution, be immediately used for after treating dyeings, for instance, of substantive dyestuffs on cotton.

The polyamine used as starting material may vary in composition. The alkylation or aralkylation may be carried out, for example, by means of arylsulfonic acid alkyl esters, benzyl-chloride or the like, or the alkylation process may be carried out in two steps. In the first phase the tertiary base may be formed in the known manner by acting on the primary or secondary base with alcohol in the presence of hydrochloric acid and then the addition of an alkylating agent to the tertiary base thus formed may occur with the formation of the quaternary ammonium salt.

We claim:—

1. Compositions consisting essentially of quaternary ammonium compounds derived by peralkylation of a polyethylenepolyamine of the formula

in association with a compound of the formula

$n$ in both formulae standing for a number greater than 2 which compositions are characterized by the property, on after-treatment therewith of dyeings on cellulose materials by means of substantive dyestuffs, of substantially improving the fastnesses of such dyeings to water, perspiration, boiling acids, and washing.

2. Process for improving the fastness of dyeings which have been prepared on cellulose materials by means of substantive dyestuffs, by aftertreating them with solutions containing products as claimed in claim 1.

3. A composition consisting essentially of quaternary ammonium compounds obtained by treating with dimethylsulfate a mixture of polyethylenepolyamines from which the fractions boiling under 10 mm. pressure up to 220° C. have been removed by distillation which composition is characterized by the property, on after-treatment therewith of dyeings on cellulose materials by means of substantive dyestuffs, of substantially improving the fastnesses of such dyeings to water, perspiration, boiling acids, and washing.

4. Process for improving the fastness of dyeings which have been prepared on cellulose materials by means of substantive dyestuffs, by aftertreating them with solutions, containing a product as claimed in claim 3.

FERDINAND MÜNZ.
KARL KELLER.